United States Patent
Badr et al.

(10) Patent No.: US 9,641,803 B1
(45) Date of Patent: May 2, 2017

(54) MULTIPLEXING FEC PROTECTION OF MULTIPLE STREAMS WITH DIFFERENT DELAY REQUIREMENTS

(71) Applicant: Cisco Technology, Inc., San Jose, CA (US)

(72) Inventors: Ahmed Atef Younes Badr, Toronto (CA); Ashish Khisti, Toronto (CA); Dan Tan, Sunnyvale, CA (US); John George Apostolopoulos, Palo Alto, CA (US); Xiaoqing Zhu, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/292,729

(22) Filed: Oct. 13, 2016

(51) Int. Cl.
- *H04N 7/14* (2006.01)
- *H04N 7/15* (2006.01)
- *H04N 7/54* (2006.01)
- *H04L 29/06* (2006.01)
- *H04L 1/00* (2006.01)

(52) U.S. Cl.
CPC ........... *H04N 7/152* (2013.01); *H04L 1/0013* (2013.01); *H04L 1/0042* (2013.01); *H04L 1/0057* (2013.01); *H04L 65/60* (2013.01); *H04N 7/54* (2013.01)

(58) Field of Classification Search
CPC ..................................................... H04N 7/14
USPC .......... 348/14.01, 14.08, 14.12, 14.13, 14.09
See application file for complete search history.

(56) References Cited

U.S. PATENT DOCUMENTS

| | | | |
|---|---|---|---|
| 2007/0276954 A1* | 11/2007 | Chan | H04N 21/222 709/231 |
| 2013/0039410 A1* | 2/2013 | Tan | H03M 13/05 375/240.02 |
| 2013/0322511 A1* | 12/2013 | Varma | H04L 27/2689 375/230 |
| 2015/0006991 A1* | 1/2015 | Won | H04N 21/2383 714/755 |
| 2016/0127215 A1* | 5/2016 | Mani | H04M 15/56 370/252 |

OTHER PUBLICATIONS

Martinian et al. "Burst Erasure Correction Codes With Low Decoding Delay"; pp. 1-11.
Martinian et al. "Low Delay Burst Erasure Correction Codes" pp. 1-5.

* cited by examiner

*Primary Examiner* — Olisa Anwah
(74) *Attorney, Agent, or Firm* — Parker Ibrahim & Berg LLC; James M. Behmke; Kenneth J. Heywood (57) ABSTRACT

In one embodiment, a device in a network identifies delay requirements of each of a plurality of media streams. The device selects a joint forward error correction (FEC) encoding strategy for the plurality of media streams based on the identified delay requirements of the streams and on a burst loss length of a communication channel. The device applies the selected joint FEC encoding strategy to the plurality of media streams, to form a multiplexed packet stream. The device sends the multiplexed packet stream to one or more nodes in the network via the communication channel.

19 Claims, 11 Drawing Sheets

MULTIPLEXING FEC PROTECTION OF MULTIPLE STREAMS WITH DIFFERENT DELAY REQUIREMENTS

TECHNICAL FIELD

The present disclosure relates generally to computer networks, and, more particularly, to multiplexing forward error correction (FEC) protection of multiple streams with different delay requirements.

BACKGROUND

It is common in conferencing systems today to have multiple streams with varying delay requirements traversing the same paths. For example, consider the use case of a video conferencing presentation. In such a case, there may be at least three different media streams: the actual presentation stream (e.g., presentation slides), a video stream (e.g., a webcam feed of the presenter), and an associated audio stream (e.g., the captured voice of the presenter).

Different types of media may have different delay requirements. For example, audio and video streams may have much tighter delay requirements than that of a slide presentation stream. Notably, a conferencing participant may not even notice a slight delay in the presentation stream. However, the video and audio streams may have much tighter delay requirements than the corresponding slide presentation stream. Furthermore, even with the video and audio for the same visual session, the audio data may have a tighter delay constraint than the associated video stream. For example, displaying a video frame slightly late may be imperceptible to the user, while a gap in the audio of a speaker can be highly distracting.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-6B illustrate example plots of the possible encoding rate limits for multiplexed media streams as a function of the difference between delay requirements of the media streams;

DESCRIPTION OF EXAMPLE EMBODIMENTS

Overview

According to one or more embodiments of the disclosure, a device in a network identifies delay requirements of each of a plurality of media streams. The device selects a joint forward error correction (FEC) encoding strategy for the plurality of media streams based on the identified delay requirements of the streams and on a burst loss length of a communication channel. The device applies the selected joint FEC encoding strategy to the plurality of media streams, to form a multiplexed packet stream. The device sends the multiplexed packet stream to one or more nodes in the network via the communication channel.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1A:
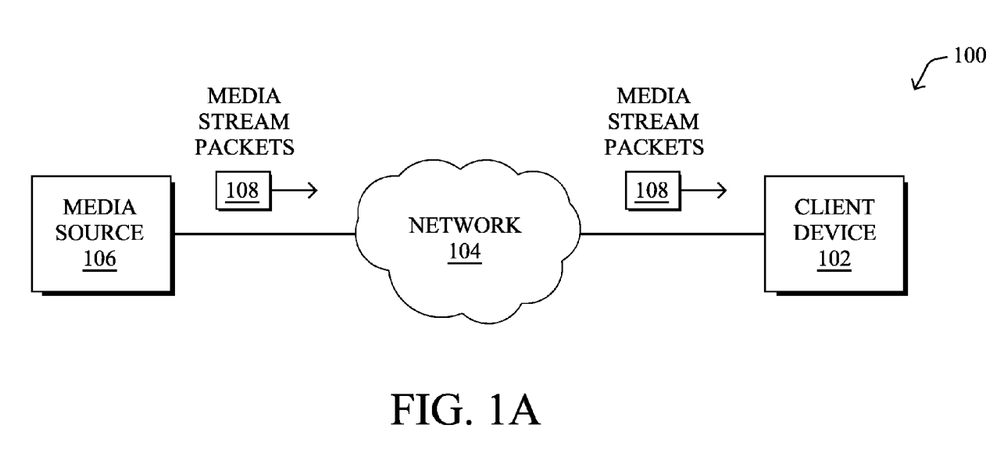
FIGS. 1A-1B illustrate examples of a communication network.

FIG. 1A illustrates an example computer system 100, according to various embodiments of the present disclosure. As shown, a client device 102 may be in communication with a media source device 106 via one or more computer networks 104. Media source device 106 provides media stream packets 108 through network(s) 104 to client device 102. As will be appreciated, network(s) 104 may include, but are not limited to, local area networks (LANs), wide area networks (WANs), the Internet, cellular networks, infrared networks, satellite networks, or any other form of data network configured to convey data between computing devices.

Network(s) 104 may include any number of wired or wireless links between client device 102 and media source device 106. Example wired links may include, but are not limited to, fiber optic links, Ethernet-based links (e.g., Category 5/5e cabling, Category 6 cabling, etc.), digital subscriber line (DSL) links, coaxial links, T carrier links, E carrier links, combinations thereof, or the like. Example wireless links may include, but are not limited to, near field-based links, WiFi links, satellite links, cellular links, infrared links, combinations thereof, or the like.

Client device 102 may be of any form of electronic device operable to communicate via network(s) 104. For example, client device 102 may be a desktop computer, a laptop computer, a tablet device, a smartphone, a wearable electronic device (e.g., a smart watch, a head up display, etc.), a smart television, a set-top device for a television, etc.

In general, client device 102 may be operable to receive media stream packets 108 and render the received content data on an electronic display. For example, client device 102 may execute a media streaming application that, when executed by client device 102, is configured to request streamed media, such as streaming video, audio, or both. In various embodiments, the media streaming application may be a stand-alone application or, alternatively, may be another form of application that is operable to render and display streaming media (e.g., a mobile application, etc.).

As shown in FIG. 1A, client device 102 may send a media streaming request to media source device 106 through network(s) 104. In response to receiving the request, media source device 106 may send media streaming packets 108 to client device 102 through network(s) 104. The client device may repeat the above process any number of times with the same or different media source devices, depending on the contents of streaming media.

As would be appreciated, while FIG. 1A depicts media source device 106 sending media stream packets 108 to client device 102, some implementations may also provide for client device 102 to send media stream packets 108 in the opposite direction, as well. For example, in the case of an online conference, client device 102 may send locally-captured audio and/or video to media source device 106. Said differently, while client device 102 may act as a client with respect to media source device 106, client device 102 may also act as its own media source device, in some embodiments.

Figure 1B:
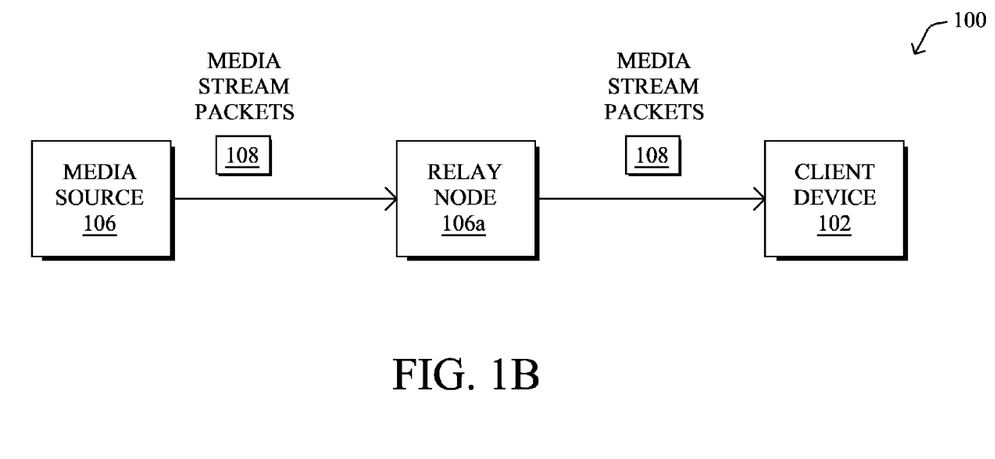

FIG. 1B illustrates another potential configuration for communication network 100, in a further example. In this example, rather than media source 106 sending media stream packets 108 directly to client device 102 via network 104, media source 106 may instead send media stream packets 108 to a relay node 106*a*. For example, relay node 106*a* may be part of a cloud-based service, such as a conferencing service or the like. Thus, in some cases, relay node 106*a* may itself be a media source from the perspective of client device 102 and may combine streams from any number of originators (e.g., audio, video, presentation, etc.).

Figure 2:
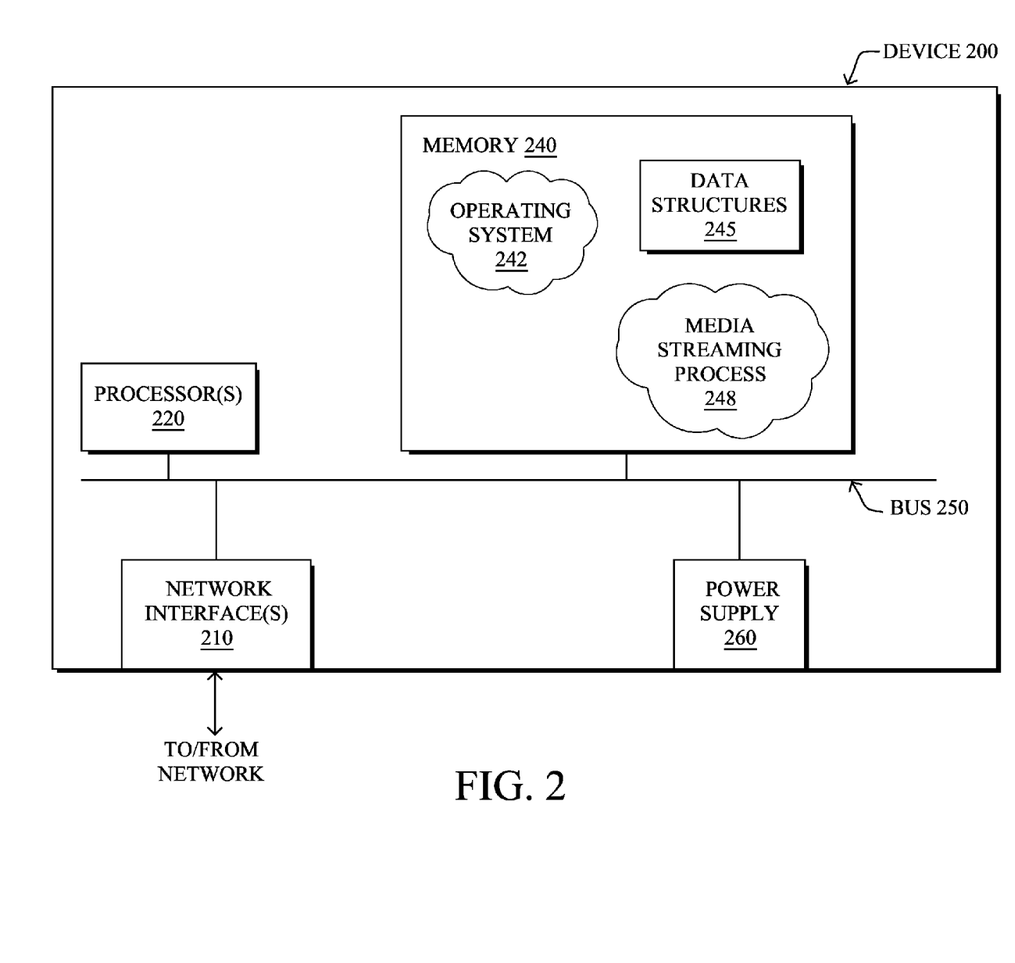
FIG. 2 illustrates an example network device/node.

FIG. 2 is a schematic block diagram of an example node/device 200 that may be used with one or more embodiments described herein, e.g., as any of the nodes shown in FIG. 1 above. In particular, device 200 may be client device 102 or media source device 106. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data to network 104. The network interfaces may be configured to transmit and/or receive data using a variety of different communication protocols. Note, further, that the nodes/devices may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which is typically resident in memory 240 and executed by the processor, functionally organizes the device by, inter alia, invoking operations in support of software processes and/or services executing on the device. These software processes and/or services may include media streaming process 248, as described herein.

It will be apparent to those skilled in the art that other processor and memory types, including various computer-readable media, may be used to store and execute program instructions pertaining to the techniques described herein.

Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, streaming media for a client media session may include multiple streams of different media. For example, a media stream may include both a video stream and a corresponding audio stream. Another example may be a media stream from a cloud-based conferencing system that relays media from different conferencing sessions. Also as noted above, the different media streams being combined in the session may have different delay requirements/deadlines before the user experience is impacted. For example, presentation streams may be more tolerant of delays than audio streams, etc.

In general, forward error correction (FEC) is a mechanism that attempts to protect network communications from errors and losses/erasures. In particular, FEC allows a sender to encode a communication in such a way that if portions/packets of the communication are lost during transmission, the receiver is still able to reconstruct the original message. In the context of media streaming, FEC is often used, due to the timing constraints involved. For example, the delay requirements of media streams are often such that it would be impossible for the receiver to request retransmission of a lost packet, while still presenting the lost data to the user in time.

Typically, media streams (e.g., audio, video, presentation, etc.) are protected by FEC independently and sent as separate streams through the network. In contrast, according to various embodiments, the sender may combine the media streams into a unified media stream and apply the same FEC in a straight-forward manner across the aggregated media streams, thereby improving FEC efficiency (e.g., reducing FEC redundancy, etc.). However, simply applying the same FEC across all of the streams would effectively ignore the different delay requirements of the streams.

Multiplexing FEC Protection of Multiple Streams with Different Delay Requirements The techniques herein allow a system to jointly apply FEC protection to a plurality of media streams with different delay requirements to hit the theoretical optimal bounds for recovery from burst loss, at least in some cases. Regardless of whether the optimal bounds are achieved, the techniques herein demonstrate better performance in terms of efficiency and redundancy over encoding each stream individually. In some aspects, depending on the delay requirements of the different media streams, and potentially other factors such as the bit rate ratios between the streams, the system may dynamically switch between FEC encoding strategies.

Specifically, according to one or more embodiments of the disclosure as described in detail below, a device in a network identifies delay requirements of each of a plurality of media streams. The device selects a joint forward error correction (FEC) encoding strategy for the plurality of media streams based on the identified delay requirements of the streams and on a burst loss length of a communication channel. The device applies the selected joint FEC encoding strategy to the plurality of media streams, to form a multiplexed packet stream. The device sends the multiplexed packet stream to one or more nodes in the network via the communication channel.

Illustratively, the techniques described herein may be performed by hardware, software, and/or firmware, such as in accordance with the media streaming process 248, which may contain computer executable instructions executed by the processor 220 to perform functions relating to the techniques described herein. For example, the techniques herein may be treated as extensions to conventional protocols, such as the various communication or media streaming protocols, and as such, may be processed by similar components understood in the art that execute those protocols, accordingly.

Figure 3:
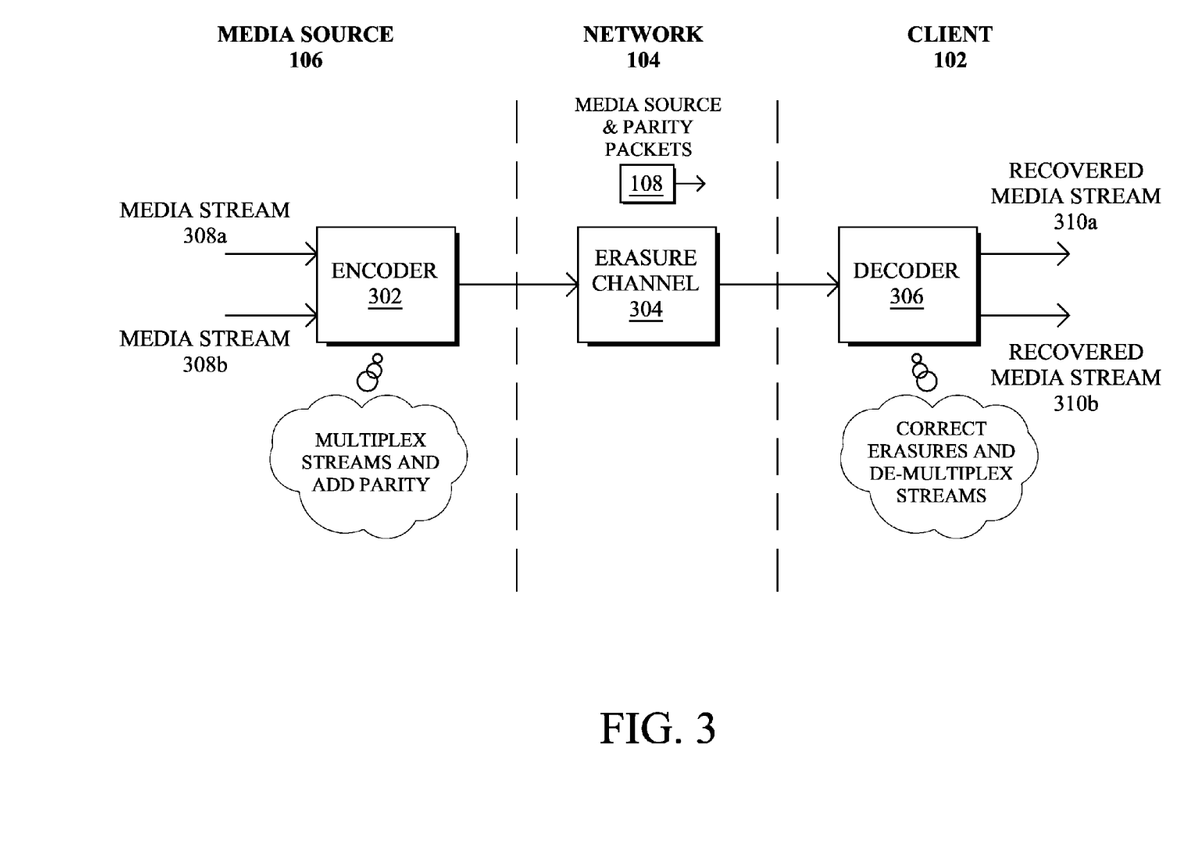
FIG. 3 illustrates an example forward error correction (FEC) mechanism for a media stream.

Operationally, FIG. 3 illustrates an example forward error correction (FEC) mechanism 300 for a media stream, in accordance with the embodiments herein. Continuing the example of FIG. 1, media source 106 may execute an encoder 302 and client device 102 may execute a corresponding decoder 306, both of which may be sub-processes of a media streaming application (e.g., media streaming process 248). In further embodiments, media source 106 may itself be a relay node, such as relay node 106a shown in FIG. 1B.

In various embodiments, encoder 302 may apply FEC encoding to any number of source media streams, such as media streams 308a-308b shown. For purposes of simplicity, the techniques herein are described with respect to multiplexing two media streams. However, as would be appreciated, the techniques herein can be applied similarly to any number of multiplexed media streams. For example, in one embodiment, three or more media streams may be grouped into two categories based on their individual delay requirements. In turn, the techniques herein can be applied to the two groups by setting the delay requirements of each group to be the minimum delay required by any of the steams in a given category.

As a result of the multiplexing and FEC encoding by encoder 302, media source 106 may send packets 108 to client device 102 via network 106 that include the source and parity information needed by client device 102 to recover the original media streams 308a-308b. In particular, media source 106 may send packets 108 via a so-called "erasure" channel 306 in network 104 that derives its name from the fact that packets 108 may be dropped/erased during transmission to client device 102. More generally, however, channel 306 may be any form of communication channel in the network and the techniques herein may also be applied to channels in which no actual erasures occur (e.g., channels that experience delays, etc.).

Client device 102 may receive packets 108 and process packets 108 using decoder 306, to produce recovered media streams 310a-310b. Ideally, recovered media streams 310a-310b will be identical to media streams 308a-308b. However, packet losses along channel 304 may result in the loss of some information during transit. Accordingly, decoder 306 may operate to correct for erasures/losses along erasures channel 304 by identifying packets that did not reach decoder 306 within the expected time and recovering lost data using the parity packets that decoder 306 actually receives. In turn, decoder 306 may provide the recovered media streams 310a-310b to the corresponding processes/devices for presentation of the media to the user of client device 102 (e.g., via a display, speaker, etc.).

In further case, streams 308a-308b may be sent to client device 102 via a relay node, such as the case illustrated in FIG. 1A. When streams 308a-308b are originally sent to the relay node, streams 308a-308b may have either the same or different latency requirements. If, for example, streams 308a-308b have different latency constraints, then the techniques herein can be directly applied at the sender (e.g., the original media source 106), in one embodiment. In either case, assume that stream 308a is affected by packet loss while enroute to the relay node. In turn, the relay node may be able to reconstruct the lost packets and retransmit to client device 102. However, reconstruction of the packets by the relay node will also result in additional delay. Thus, in this example, stream 308a may have tighter delay constraints than before and, in various embodiments, the techniques herein can also be applied at the relay node, or reapplied and adapted at the relay node, if the techniques herein are initially applied at the sender, and across streams 308a-308b while accounting for the different delay constraints. Note that the above network configurations are illustrative only and the techniques herein may be applied by any device in a network that applies encoding to media streams.

To fully recover the media data lost during a bust loss of length B, decoder 306 must wait enough time to receive B parity packets. However, as noted previously, each media stream may its own delay requirements before such a delay is noticeable to the user of client device 102. For decoder 306 to recover a single burst B by a deadline T, there is a lower bound on the FEC overhead. In particular, this corresponds to an upper limit on the FEC "rate," which is defined as follows:

$$R = \frac{\text{Bytes}_{Data}}{\text{Bytes}_{Data} + \text{Bytes}_{FEC}}$$

where R is the FEC encoding rate, $\text{Bytes}_{Data}$ is the amount of media data bytes transmitted by packets 108, and $\text{Bytes}_{FEC}$ is the amount of FEC bytes added by encoder 302 to packets 108. For example, a 100% FEC overhead corresponds to an FEC encoding rate of 1/(1+1)=0.5, while a 10% FEC overhead corresponds to an FEC encoding rate of 1(1+0.1)=0.91. In other words, the encoding rate is a measure of efficiency and a high rate corresponds to high efficiency and low overhead.

In order to satisfy the delay requirements of media streams 308a-308b, certain constraints may exist for the encoding methodology used by encoder 302. Notably, let $S_1[i]$ represent media stream 308a and $S_2[i]$ represent media stream 308b and let $S[i]=(S_1[i], S_2[i])$. The sizes of $S_1[i]$ and $S_2[i]$ are $\alpha k$ and $(1-\alpha)k$, respectively, where $\alpha$ is the fraction of bytes in the low-deadline stream, $S_1[i]$. Further, assume that the maximum tolerable delay for $S_1[i]$ and $S_2[i]$ are $T_1$ and $T_2$, respectively. Thus, in the presence of a burst of length B or less in erasure channel 304, decoder 306 must:

1. decode $S_1[i]$ at time $i+T_1$; and
2. decode $S_2[i]$ at time $i+T_2$.

Now, assume that encoder 302 generates a stream of parities p[i] of size n−k bytes. In such a case, the FEC encoding rate is k/n and the overhead is (n−k)/k. This gives the following bounds for the FEC rate:

$$R \leq \frac{T_1}{T_1 + \alpha B} = R_1$$

$$R \leq \frac{T_2}{T_2 + B} = R_2$$

$$R \le \frac{T_1}{T_1 + B - (1-\alpha)(T_2 - T_1)} = R_3, T_2 \le T_1 + B$$

Figure 4A:
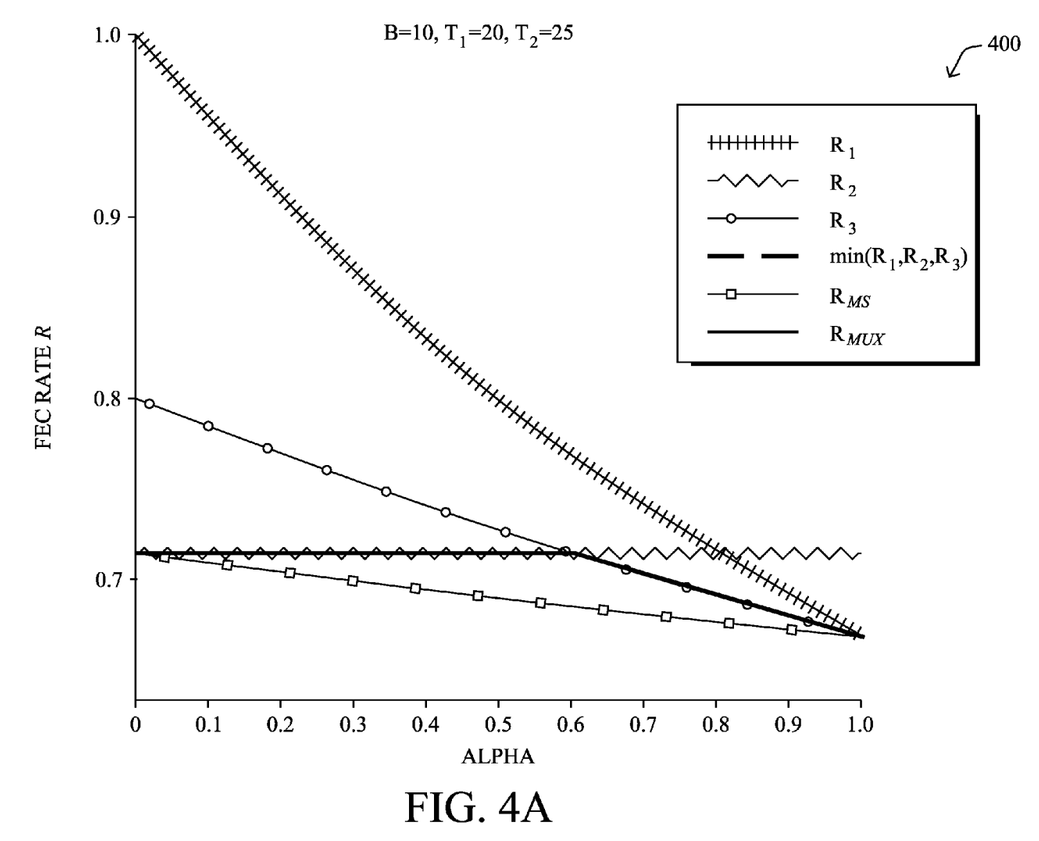
Figure 4B:
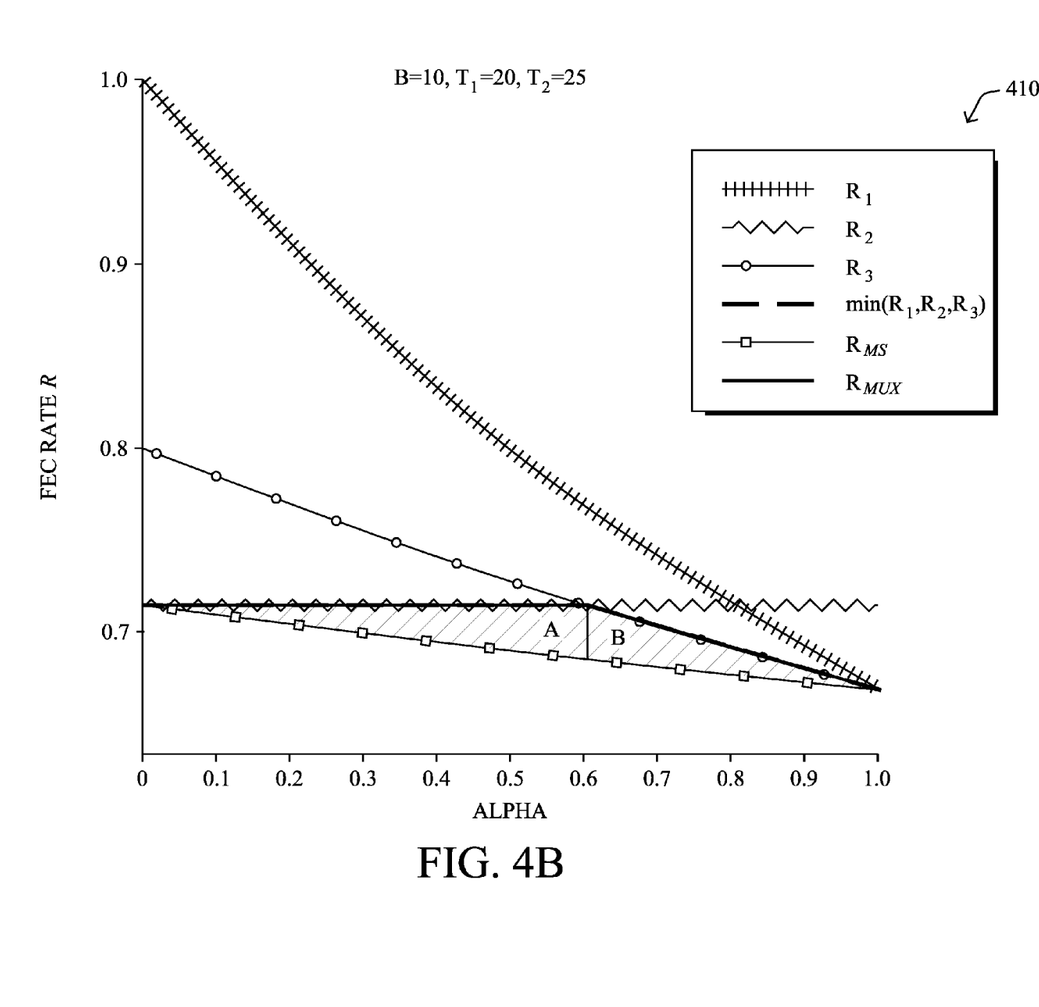
Figure 5A:
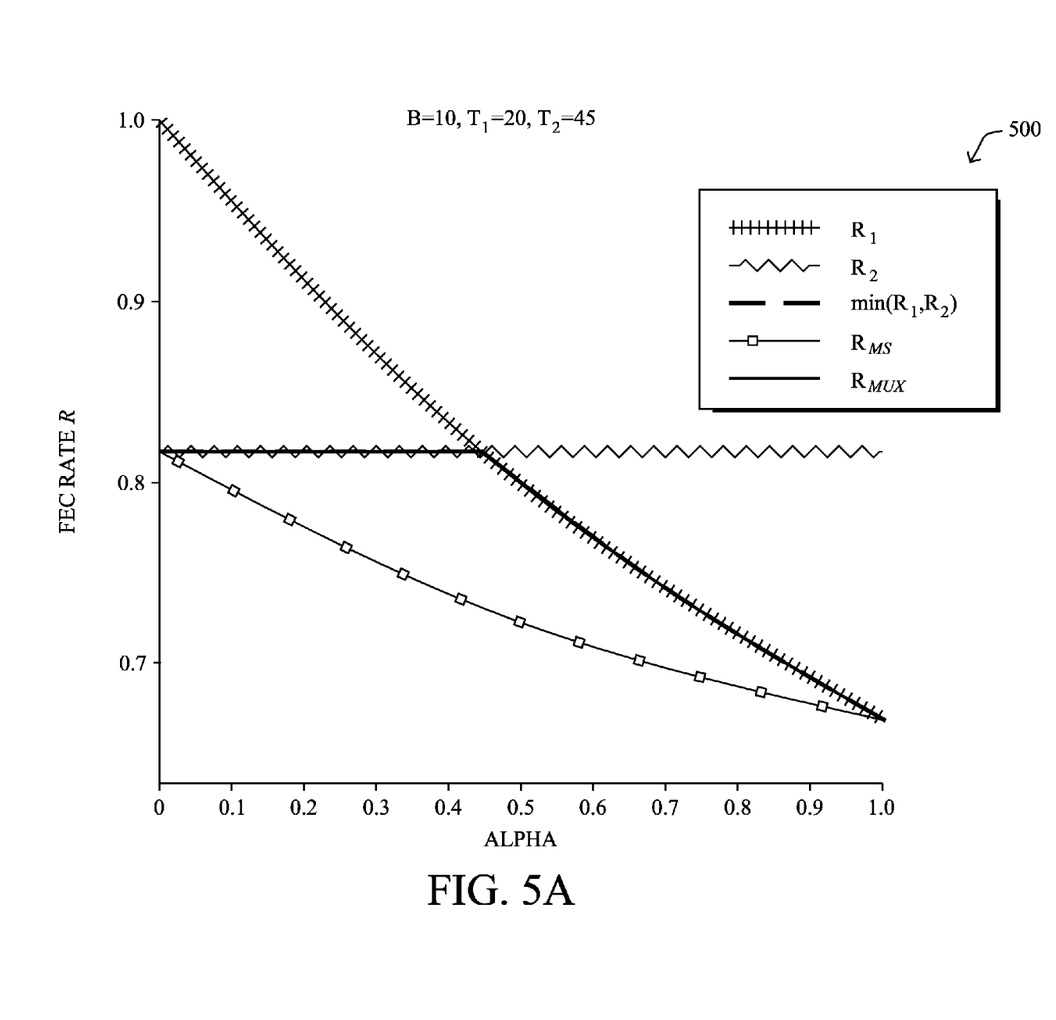
Figure 5B:
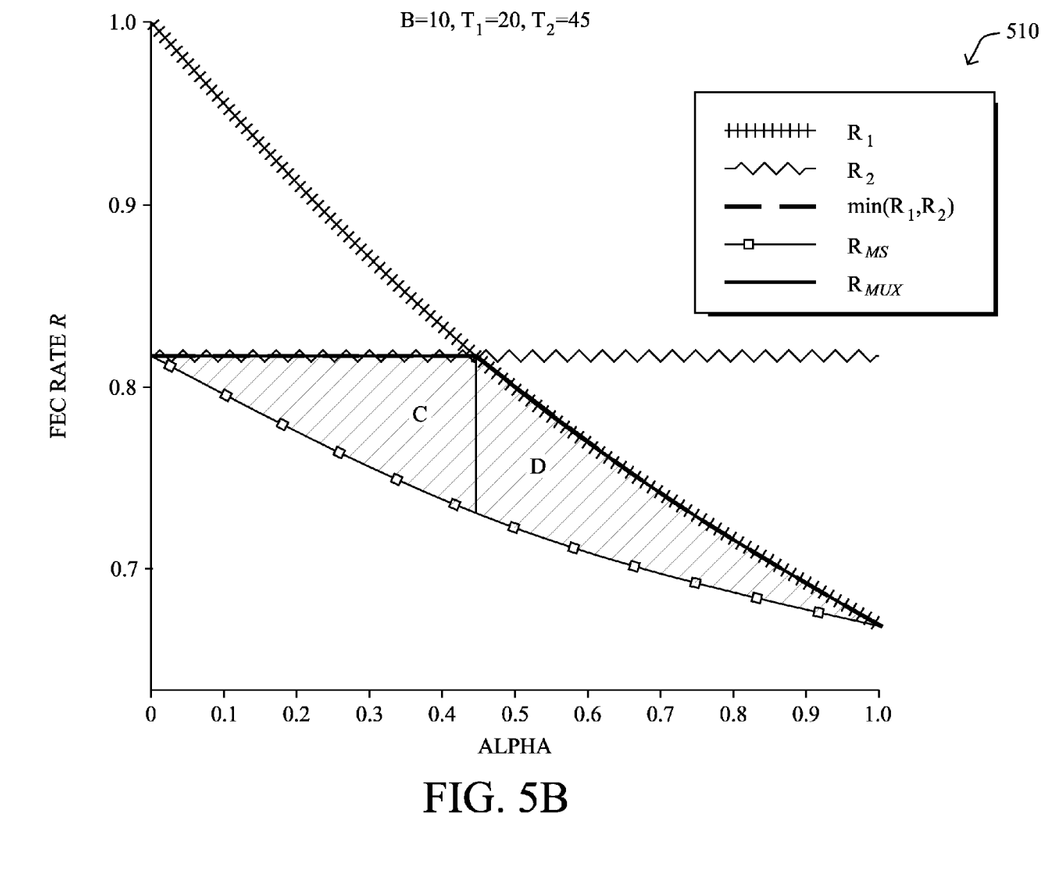
Figure 6A:
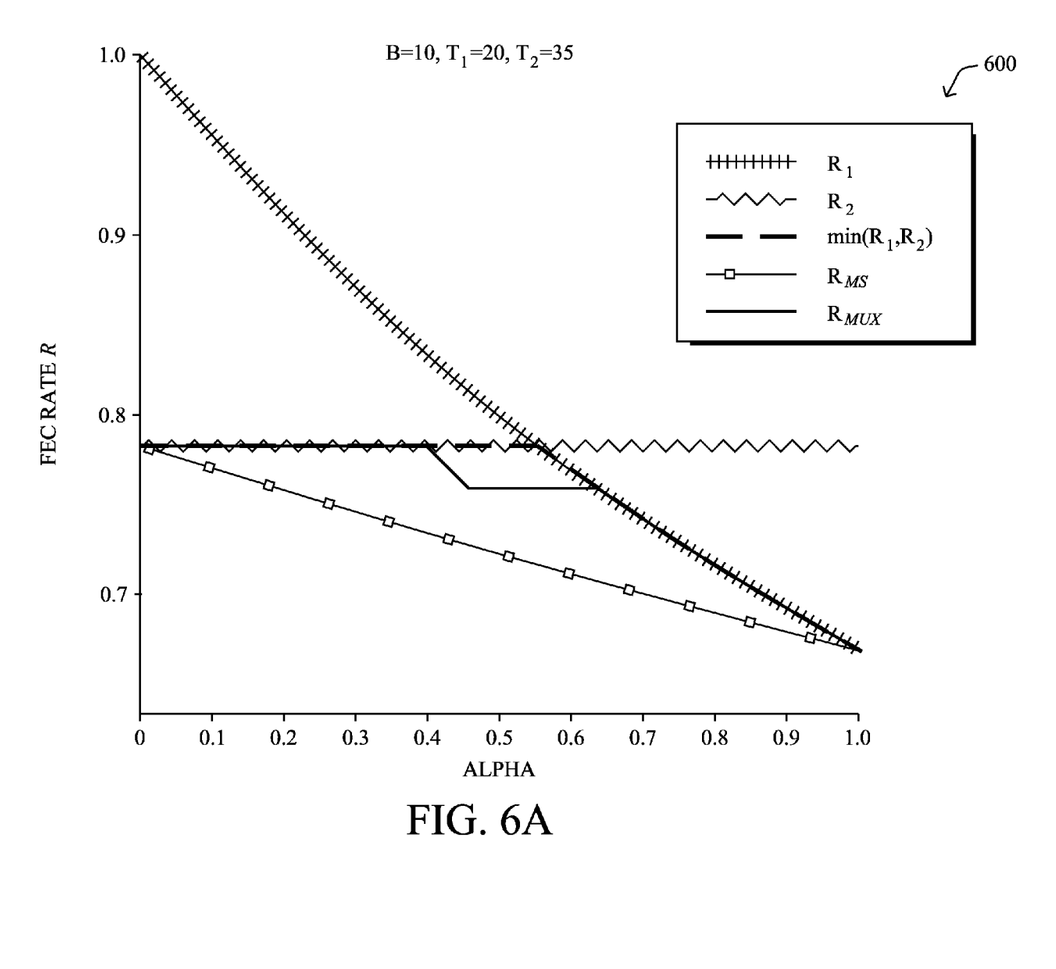
Figure 6B:
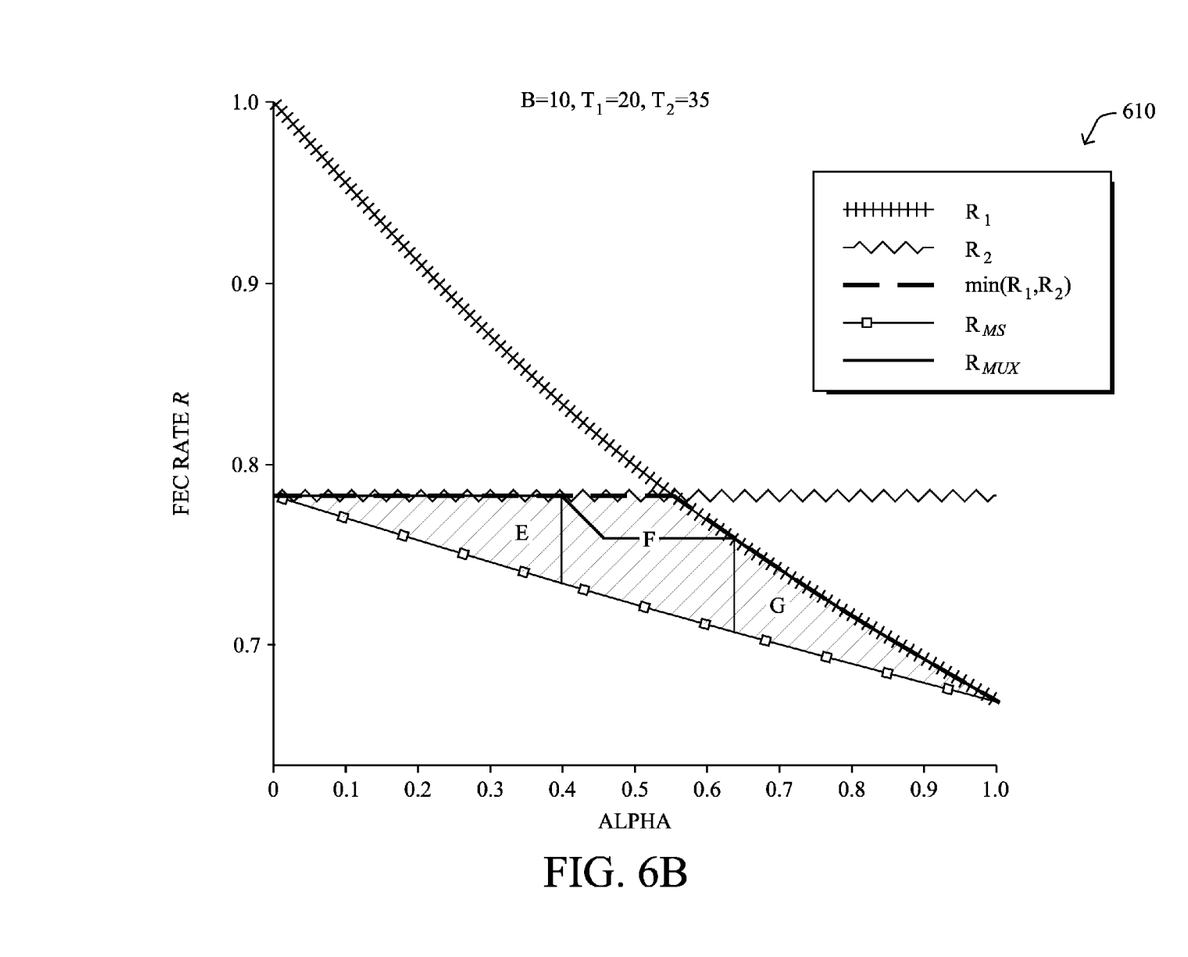

Example plots illustrating the above bounds on the FEC encoding rate are show in FIGS. 4A-4B, 5A-5B and 6A-6B as rates $R_1$, $R_2$ and $R_3$, respectively. In particular, plots 400-410 shown in FIGS. 4A-4B plot the above bounds when B=10, $T_1$=20, and $T_2$=25. In other words, plots 400-410 in FIGS. 4A-4B illustrate the case in which one media stream has a relatively low delay requirement, e.g., $T_2 \le T_1 + B$. Plots 500-510 in FIGS. 5A-5B illustrate the case when the second stream has a relatively large delay, $T_2 \ge T_1 + 2B$, and $T_2$=45 is used instead. FIGS. 6A-6B illustrate another case where $T_2$=35, medium delay case, i.e., $T_1 + B \le T_2 \le T_1 + 2B$. The minimum of the three bounds is plotted as min($R_1$, $R_2$, $R_3$). This is also the maximum possible FEC rate that can be achieved. The achievable FEC rate using the proposed FEC is also plotted as $R_{MUX}$.

Also shown in plots 400-410, 500-510 and 600-610 are curves $R_{MS}$ that denote the FEC encoding rate achieved by applying separate error correcting codes independently to the two streams with different delays, but otherwise use optimal codes for their respective delays. In particular, such codes may use the encoding proposed in the paper, "Burst Erasure Correction Codes with Low Decoding Delay," by E. Martinian and C. W. Sundburg, published in the IEEE Transactions on Information Theory, vol. 50, no. 10, pp. 2494-2502 (2004). Such an encoding is optimized for a single stream having a delay requirement.

Referring to plots 410, 510 and 610, particularly, the regions A-G above $R_{MS}$ and within the bound of min($R_1$, $R_2$, $R_3$) represent the potential gains that can be realized by a joint FEC code over simply encoding the streams separately. In particular, these regions demonstrate an increase in the achievable bit rate and a corresponding reduction in FEC overhead, while still providing the same performance as that of separate encoding (e.g., in terms of error correction capability and meeting the deadlines for each stream).

A key observation is that regions A-G shown in plots 410, 510 and 610 of FIGS. 4B, 5B and 6B are achievable using different FEC encoding strategies, to jointly encode the media streams based on their delay requirements. In particular, encoder 302 may select an FEC encoding strategy that results in an encoding rate that falls within one of the optimal regions A-G, thereby demonstrating improved performance over encoding the streams separately.

Figure 7:
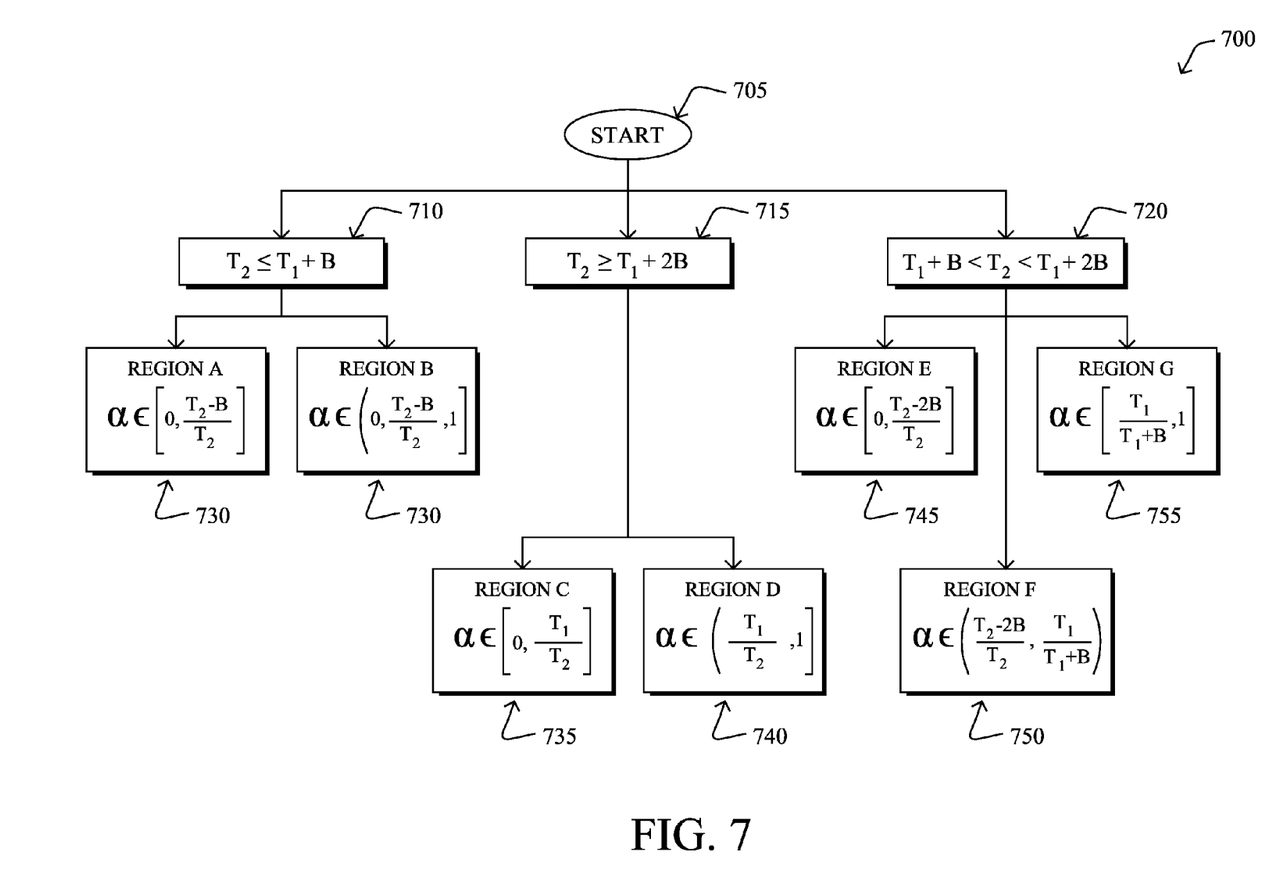
FIG. 7 illustrates an example decision tree to select an FEC encoding strategy based on the delay requirements of the multiplexed media streams.

FIG. 7 illustrates an example decision tree 700 that encoder 302 may use to select an FEC encoding strategy based on the delay requirements of the multiplexed media streams, according to some embodiments. In particular encoder 302 may start the decision process by determining whether the delay requirement $T_2 \le T_1 + B$ (block 705). If so, encoder 302 may proceed to block 710 of decision tree 700. However, if $T_2 \ge T_1 + 2B$, encoder 302 may proceed to block 715. Otherwise, if $T_1 + B \le T_2 \le T_1 + 2B$, encoder 302 may proceed to block 720. As would be appreciated, these are the three different possible scenarios illustrated in FIGS. 4A-4B, 5A-5B, and 6A-6B.

Next, encoder 302 may proceed to one of blocks 725-755, depending on the value of a, which is the fraction of bytes in the lower deadline media stream, i.e., stream $S_1[i]$ with delay requirement $T_1$. In particular, if processing by encoder 302 is currently at block 710 (i.e., $T_2 \le T_1 + B$), encoder 302 may then determine whether $\alpha \le (T_2-B)/T_2$. If so, then the optimal achievable FEC rate is given by $R_1$ which is the upper limit of region A shown in plot 410 of FIG. 4B, and proceed to block 725. However, if $\alpha \ge (T_2-B)/T_2$, encoder 302 may instead determine that the optimal achievable FEC rate is given by $R_3$, the upper limit of region B shown in plot 410 of FIG. 4B, and proceed to block 725.

If processing by encoder 302 is currently at block 715 (i.e., $T_2 \ge T_1 + 2B$), encoder 302 may determine whether $\alpha \le T_1/T_2$. If so, then encoder 302 may determine that the optimal achievable FEC rate is $R_2$, the upper limit of region C shown in plot 510 of FIG. 5B, and proceed to block 735. Otherwise, encoder 302 may proceed to block 740 to achieve the optimal FEC rate of $R_1$, the upper limit of region D in plot 510 of FIG. 5B.

Similarly, if processing by encoder 302 is currently at block 720 (i.e., $T_1 + B \le T_2 \le T_1 + 2B$), encoder 302 may determine where $\alpha \in [0,(T_2-B)/T_2]$, $\alpha \in ((T_2-2B)/T_2, T_1/T_1+B)$, or $\alpha \in [T_1/T_1+B,1]$, then encoder 302 may proceed to block 745, 750, or 755 and achieve an FEC rate given by the upper limits of region E, F or G shown in plot 610 of FIG. 6B, respectively.

Depending on the results of decision tree 700, encoder 302 may select an FEC encoding strategy that achieves an FEC rate for the corresponding one of regions A-G, according to various embodiments. Notably, encoder 302 may dynamically switch between encoding strategies, based on the delay requirements of the media streams, the burst loss length B, and/or the fraction of bytes in the low deadline stream (a).

By way of illustration of decision tree 700, consider the case of a video stream and a presentation stream that are to be multiplexed with respective delay requirements of 120 ms and 230 ms. In other words, the presentation stream is more tolerable of delays than that of the video stream. Also, assume that the bit rates of the two streams are equal and that the channel mostly introduces burst losses of length below or equal to B=50 ms. In such a case, then [$T_2$=230 ms]> [($T_1$=120 ms)+(2B=100 ms)=220 ms] and $\alpha$=0.5<[($T_1$=120 ms)/($T_2$=230 ms)≈0.52], meaning that encoder 302 should proceed to block 735 in plot 700 in FIG. 7 and achieve a rate of $R_2$, the upper limit of region C in plot 510 in FIG. 5B. With these same parameters, optimally encoding the two streams independently would require an FEC rate of 0.76 and an FEC overhead of 32%. However, encoding the streams jointly to form a multiplexed stream using the encoding strategy for region A detailed below would require only an FEC rate of $R_2$=($T_2$=230 ms)/($T_2$+B=280 ms)=0.82 and an FEC overhead of 22%, which also means a reduction in overhead from that of individual encoding by (32−22)/22=45%.

Encoding Strategy for Region A

If encoder 302 determines that an encoding strategy associated with region A should be used, encoder 302 may encode media streams 308a-308b as follows, according to various embodiments. First, let $S_1[i]$, and $S_2[i]$ be the sequence of packets for the low and high delay streams 308a-308b, respectively. Note that they are in general of different sizes. Then, encoder 302 may first split every packet of the second sequence into two sub-packets, i.e., $S_2[i]=(S_{2,1}[\ ],S_{2,2}[i])$ where $S_{2,1}[\ ]$ and $S_{2,2}[i]$ are of sizes $\alpha Bk/(T_2-T_1)$ and $((1-\alpha)T_2-B)k/(T\alpha-B)$ bytes, respectively. To obtain intermediate packets sequences $P_1[i]$, $P_{2,1}[i]$ and $P_{2,2}[i]$, encoder 302 may then apply the following codes:

$$S_1[i] \to MS(B,T_2-B) \to P_1[i]$$

$$S_{2,1}[i] \to MS(T_2,T_2) \to P_{2,1}[i]$$

$$S_{2,2}[i] \rightarrow MS(B,T_2) \rightarrow P_{2,2}[i].$$

where MS represents the optimal encoding for individual streams proposed by Martinian and C. W. Sundburg, mentioned earlier. In turn, encoder 302 may combine the intermediate packet sequences $P_1[i]$, $P_{2,1}[i]$ and $P_{2,2}[i]$ to form the final FEC packet=$(P_1[i]+P_{2,1}[i], P_{2,2}[i])$, where + denotes a bit-wise XOR operation. Doing so achieves the desired rate $T_2/(T_2+B)=R_2$, the upper limit of region A, and allows decoder 306 to recover from a burst loss B within the respective deadlines of the two streams.

Encoding Strategy for Region B

To achieve an FEC rate according to region B above, encoder 302 may instead apply the following encoding strategy, according to various embodiments. First, encoder 302 may split each packet in the low delay sequence, i.e., $S_1[i]=(S_{1,1}[i],S_{1,2}[i])$, where $S_{1,1}[i]$ and $S_{1,2}[i]$ are of sizes $(1-\alpha)(T_2-B)k/B$ bytes and $(B-(1-\alpha)T_2)k/B$ bytes, respectively. Then, encoder 302 may form intermediate packet sequences $P_{1,1}[i]$, $P_{1,2}[i]$ and $P_2[i]$, as follows:

$$S_{1,1}[i] \rightarrow MS(B,T_2-B) \rightarrow P_{1,1}[i],$$

$$S_{1,2}[i] \rightarrow MS(B,T_1) \rightarrow P_{1,2}[i],$$

$$S_2[i] \rightarrow MS(T_2,T_2) \rightarrow P_2[i].$$

Encoder 302 may then form the final FEC packet as $(P_{1,1}[i]+P_{1,2}[i], P_2[i])$. Doing so achieves the desired rate $T_1/(T_1+B-(1-\alpha)(T_2-T_1))=R_3$, the upper limit of region B, and allows decoder 306 to recover from a burst loss B within the respective deadlines of the two streams.

Encoding Strategy for Region C

To achieve an FEC rate according to region C above, encoder 302 may instead apply the following encoding strategy, according to various embodiments. First, encoder 302 splits each packet in the second sequence into three sub-packets, $S_2[i]=(S_{2,1}[i], S_{2,2}[i], S_{2,3}[i])$ of sizes $\alpha(T_2-T_1-B)k/T_1$ bytes, $\alpha Bk/T1$ bytes and $(T1-\alpha T2)k/T1$ bytes, respectively. Then, encoder 302 may generate intermediate packets $P_1[i]$, $P_{2,1}[i]$, $P_{2,2}[i]$ and $P_{2,3}[i]$ as follows:

$$S_1[i] \rightarrow MS(B,T_1) \rightarrow P_1[i].$$

$$S_{2,1}[i] \rightarrow MS(B,T_2-T_1-B) \rightarrow P_{2,1}[i],$$

$$S_{2,2}[i] \rightarrow MS(T_1+B,T_1+B) \rightarrow P_{2,2}[i],$$

$$S_{2,3}[i] \rightarrow MS(B,T_2) \rightarrow P_{2,3}[i],$$

In turn, encoder 302 may form the final FEC packet as $(P_1[i]+P_{2,1}[i-T_1-B]+P_{2,2}[i], P_{2,3}[i])$. Doing so achieves the desired rate $T_2/(T_2+B)=R_2$, the upper limit of region C, and allows decoder 306 to recover from a burst loss B within the respective deadlines of the two streams.

Encoding Strategy for Region D

To achieve an FEC rate according to region D above, encoder 302 may instead apply the following encoding strategy, according to various embodiments. First, encoder 302 splits each packet in the first sequence into two sub-packets, $S_1[i]=(S_{1,1}[i], S_{1,2}[i])$ of sizes $(1-\alpha)T_1k/(T_2-T_1)$ bytes and $(\alpha T_2-T_1)k/(T_2-T_1)$ bytes, respectively. Similarly, encoder 302 splits each packet in the second sequence into two sub-packets, $S_2[i]=(S_{2,1}[i], S_{2,2}[i])$ of sizes $(1-\alpha)(T_2-T_1-B)k/(T_2-T_1)$ bytes and $(1-\alpha)Bk/(T_2-T_1)$ bytes, respectively. Then, encoder 302 may generate intermediate packets $P_{1,1}[i]$, $P_{1,2}[i]$, $P_{2,1}[i]$ and $P_{2,2}[i]$ as follows:

$$S_{1,1}[i] \rightarrow MS(B,T_1) \rightarrow P_{1,1}[i].$$

$$S_{1,2}[i] \rightarrow MS(B,T_1) \rightarrow P_{1,2}[i].$$

$$S_{2,1}[i] \rightarrow MS(B,T_2-T_1-B) \rightarrow P_{2,1}[i],$$

$$S_{2,2}[i] \rightarrow MS(T_1+B,T_1+B) \rightarrow P_{2,2}[i],$$

In turn, encoder 302 may form the final FEC packet as $(P_{1,1}[i]+P_{2,1}[i-T_1-B]+P_{2,2}[i], P_{1,2}[i])$. Doing so achieves the desired rate $T_1/(T_1+\alpha B)=R_1$, the upper limit of region D, and allows decoder 306 to recover from a burst loss B within the respective deadlines of the two streams.

Encoding Strategy for Region E

To achieve an FEC rate according to region E above, encoder 302 may instead apply the following encoding strategy, according to various embodiments. First, encoder 302 updates the values of $T_1$ to $T_1^*=T_2-2B<T_1$. Since $T_2=T_1^*+2B$ and $\alpha \leq T_1^*/T_2=(T_2-2B)/T_2$, encoder 302 can use the FEC of Region C above with parameters B, $T_1^*$ and $T_2$ to achieve a rate of $R_2=T_2/(T_2+B)$, the upper limit of region E.

Encoding Strategy for Region F

To achieve an FEC rate according to region F above, encoder 302 may instead apply the following encoding strategy, according to various embodiments. Depending on the following two cases, encoder 302 may proceed differently Case 1: $(T_2-2B)/T_2 < \alpha \leq (T_2-2B)/(T_1+B)$ Encoder 302 may first update the value of $T_1$ to $T_1^*=T_2-2B<T_1$. Since $\alpha > T_1^*/T_2=(T_2-2B)/T_2$, encoder 302 may use the FEC of region D with parameters B, $T_1^*$ and $T_2$ to achieve the FEC rate $R_1=T_1^*/(T_1^*+\alpha B)=(T_2-2B)/(T_2-2B+\alpha B)$ which falls within region F.

Case 2: $(T_2-2B)/(T_1+B) < \alpha < T_1/(T_1+B)$

Encoder 302 may first update the value of $T_2$ to $T_2^*=T_1+B<T_2$. Since $\alpha<(T_2^*-B)/T_2^*=T_1/(T_1+B)$, encoder 302 may use the FEC of region A with parameters B, $T_1$ and $T_2^*$ to achieve the FEC rate $R_2=T_2^*/(T_2^*+B)=(T_1+B)/(T_1+2B)$ which falls within region F.

Encoding Strategy for Region G

To achieve an FEC rate according to region G above, encoder 302 may instead apply the following encoding strategy, according to various embodiments. First, encoder 302 updates the values of $T_2$ to $T_2^*=T_1+B<T_2$. Since $T_2^*=T_1+B$ and $\alpha \geq (T_2^*-B)/T_2^*=(T_1)/(T_1+B)$, encoder 302 can use the FEC of Region B above with parameters B, $T_1$ and $T_2^*$ to achieve a rate of $R_3=T_1/(T_1+B-(1-\alpha)(T_2^*-T_1))=T_1/(T_1+\alpha B)=R_1$, the upper limit of region G.

Figure 8:
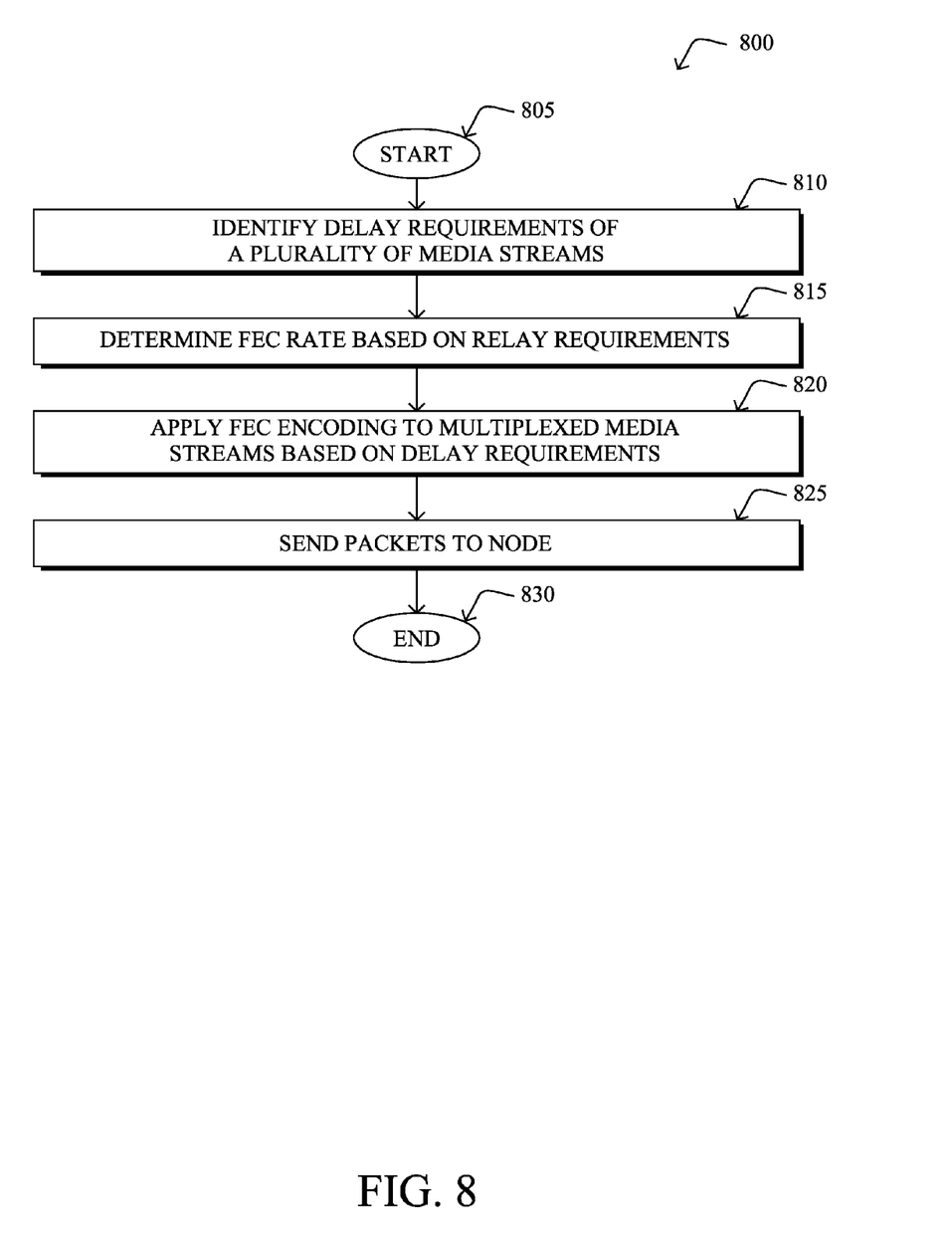
FIG. 8 illustrates an example simplified procedure for encoding multiplexed media streams.

FIG. 8 illustrates an example simplified procedure for encoding multiplexed media stream, in accordance with one or more embodiments described herein. The procedure 800 may start at step 805, and continues to step 810, where, as described in greater detail above, a device in a network (e.g., device 200 executing media streaming process 248) may identify the delay requirements of each of a plurality of media streams. In some embodiments, the device may do so based on the type of media in each stream. For example, the device may determine the delay requirements of a particular stream based on whether the stream includes audio, video, or presentation data.

At step 815, as detailed above, the device may select a joint FEC encoding strategy for the plurality of media streams. In some embodiments, the device may do so based on the identified delay requirements of the streams and on a burst loss length of an erasure/communication channel. For example, if the plurality of media streams includes two different streams, the device may determine whether any of the conditions depicted in FIG. 7 are met.

At step 820, the device may apply the selected joint FEC encoding strategy to the plurality of media streams, to form a multiplexed packet stream, as described in greater detail above. In particular, rather than encode the streams separately, the device may apply an appropriate encoding strategy across all of the streams, to achieve an encoding rate that is greater than that of encoding the streams separately and with a reduced FEC overhead. For example, the device may use a selected one of the encoding strategies described above, depending on the corresponding region of operation.

At step 825, as detailed above, the device may send the stream of packets to one or more nodes in the network. In turn, the receiving nodes may decode and de-multiplex the received packets, attempt to recover any lost information, and provide the recovered media streams to their appropriate user interfaces (e.g., a display, a speaker, etc.). Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the dynamic application of different FEC encoding strategies, to jointly encode a plurality of media streams while taking into account their different delay requirements. In particular, the techniques herein enable a media streaming system to achieve the same loss recovery performance and deadlines as that of a disjoint/individual approach, while achieving a lower FEC overhead.

While there have been shown and described illustrative embodiments that provide for the multiplexing of FEC protection of multiple media streams with different delay requirements, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of networks. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   identifying, by a device in a network, delay requirements of each of a plurality of media streams;
   selecting, by the device, a joint forward error correction (FEC) encoding strategy for the plurality of media streams based on the identified delay requirements of the streams and on a burst loss length of a communication channel;
   applying, by the device, the selected joint FEC encoding strategy to the plurality of media streams, to form a multiplexed packet stream; and
   sending, by the device, the multiplexed packet stream to one or more nodes in the network via the communication channel.

2. The method as in claim 1, wherein the media streams comprise at least one audio stream and at least one video stream.

3. The method as in claim 1, wherein selecting the joint FEC encoding strategy for the plurality of media streams comprises:
   determining, by the device, whether a delay requirement of a first one of the media streams plus twice the burst loss length of the communication channel is less than or equal to a delay requirement of a second one of the media streams.

4. The method as in claim 3, wherein the delay requirements of the first and second media streams correspond to delay deadlines before delays in the media streams are perceivable to a user of the one or more nodes, and wherein the first media stream has a shorter delay deadline than that of the second media stream.

5. The method as in claim 3, wherein selecting the joint FEC encoding strategy for the plurality of media streams further comprises:
   determining, by the device, whether a fraction of bytes in the first media stream to total bytes in the plurality of media streams is less than or equal to a ratio of the delay deadline of the first media stream to that of the second media stream.

6. The method as in claim 1, wherein selecting the joint FEC encoding strategy for the plurality of media streams comprises:
   determining, by the device, whether a delay requirement of a first one of the media streams plus the burst loss length of the communication channel is less than a delay requirement of a second one of the media streams and whether the delay requirement of the second media stream is less than or equal to the delay requirement of the first media stream plus twice the burst loss length of the communication channel.

7. The method as in claim 6, wherein selecting the joint FEC encoding strategy for the plurality of media streams further comprises:
   determining, by the device, whether a fraction of bytes in the first media stream to total bytes in the plurality of media streams is equal to one or is equal to a ratio of the delay deadline of the first media stream to that of the delay deadline of the first media stream plus the burst loss length of the communication channel.

8. The method as in claim 1, wherein selecting the joint FEC encoding strategy for the plurality of media streams comprises:
   determining, by the device, whether a delay requirement of a first one of the media streams plus the burst loss length of the communication channel is greater than or equal to a delay requirement of a second one of the media streams.

9. The method as in claim 8, wherein selecting the joint FEC encoding strategy for the plurality of media streams comprises:
   determining, by the device, whether a fraction of bytes in the first media stream to total bytes in the plurality of media streams is greater than a ratio of a difference between the delay requirement of the second media stream and the burst loss length of the communication channel to the delay requirement of the second media stream.

10. An apparatus, comprising:
one or more network interfaces to communicate with a network;
a processor coupled to the network interfaces and configured to execute one or more processes; and
a memory configured to store a process executable by the processor, the process when executed operable to:
identify delay requirements of each of a plurality of media streams;
select a joint forward error correction (FEC) encoding strategy for the plurality of media streams based on the identified delay requirements of the streams and on a burst loss length of a communication channel;
apply the selected joint FEC encoding strategy to the plurality of media streams, to form a multiplexed packet stream; and
send the multiplexed packet stream to one or more nodes in the network via the communication channel.

11. The apparatus as in claim 10, wherein the apparatus selects the joint FEC encoding strategy for the plurality of media streams by:
determining whether a delay requirement of a first one of the media streams plus twice the burst loss length of the communication channel is less than or equal to a delay requirement of a second one of the media streams.

12. The apparatus as in claim 11, wherein the delay requirements of the first and second media streams correspond to delay deadlines before delays in the media streams are perceivable to a user of the one or more nodes, and wherein the first media stream has a shorter delay deadline than that of the second media stream.

13. The apparatus as in claim 11, wherein the apparatus further selects the joint FEC encoding strategy by:
determining whether a fraction of bytes in the first media stream to total bytes in the plurality of media streams is less than or equal to a ratio of the delay deadline of the first media stream to that of the second media stream.

14. The apparatus as in claim 10, wherein the apparatus selects the joint FEC encoding strategy by:
determining whether a delay requirement of a first one of the media streams plus the burst loss length of the communication channel is less than a delay requirement of a second one of the media streams and whether the delay requirement of the second media stream is less than or equal to the delay requirement of the first media stream plus twice the burst loss length of the communication channel.

15. The apparatus as in claim 14, wherein the apparatus further selects the joint FEC encoding strategy by:
determining whether a fraction of bytes in the first media stream to total bytes in the plurality of media streams is equal to one or is equal to a ratio of the delay deadline of the first media stream to that of the delay deadline of the first media stream plus the burst loss length of the communication channel.

16. The apparatus as in claim 10, wherein the apparatus selects the joint FEC encoding strategy for the plurality of media streams by:
determining whether a delay requirement of a first one of the media streams plus the burst loss length of the communication channel is greater than or equal to a delay requirement of a second one of the media streams.

17. The apparatus as in claim 16, wherein the apparatus further selects the joint FEC encoding strategy by:
determining whether a fraction of bytes in the first media stream to total bytes in the plurality of media streams is greater than a ratio of a difference between the delay requirement of the second media stream and the burst loss length of the communication channel to the delay requirement of the second media stream.

18. A tangible, non-transitory, computer-readable media having software encoded thereon, the software when executed by a device in a network operable to:
identify delay requirements of each of a plurality of media streams;
select a joint forward error correction (FEC) encoding strategy for the plurality of media streams based on the identified delay requirements of the streams and on a burst loss length of a communication channel;
apply the selected joint FEC encoding strategy to the plurality of media streams, to form a multiplexed packet stream; and
send the multiplexed packet stream to one or more nodes in the network via the communication channel.

19. The computer-readable media as in claim 18, wherein the media streams comprise at least one audio stream and at least one video stream.

* * * * *

UNITED STATES PATENT AND TRADEMARK OFFICE
CERTIFICATE OF CORRECTION

PATENT NO. : 9,641,803 B1
APPLICATION NO. : 15/292729
DATED : May 2, 2017
INVENTOR(S) : Ahmed Atef Younes Badr et al.

Page 1 of 1

It is certified that error appears in the above-identified patent and that said Letters Patent is hereby corrected as shown below:

In the Specification

In Column 7, Line 62, please amend as shown:
depending on the value of α, which is the fraction of bytes In Column 8, Line 28, please amend as shown:
stream (α).

Signed and Sealed this
Twelfth Day of January, 2021

Andrei Iancu
*Director of the United States Patent and Trademark Office*